United States Patent [19]

Wu

[11] Patent Number: 6,105,144
[45] Date of Patent: Aug. 15, 2000

[54] SYSTEM AND METHOD FOR ALLEVIATING SKEW IN A BUS

[75] Inventor: Leon Li-Heng Wu, Autin, Tex.

[73] Assignee: International Business Machines Corporation, Armonk, N.Y.

[21] Appl. No.: 09/033,424

[22] Filed: Mar. 2, 1998

[51] Int. Cl.[7] .................................................. G06F 1/12
[52] U.S. Cl. .......................................... 713/401; 713/503
[58] Field of Search ..................................... 713/400, 401, 713/503

[56] References Cited

U.S. PATENT DOCUMENTS

| | | | |
|---|---|---|---|
| 5,608,896 | 3/1997 | Vogley | 713/503 |
| 5,692,165 | 11/1997 | Jeddeloh et al. | 713/400 |
| 5,872,959 | 2/1999 | Nguyen et al. | 395/552 |
| 5,923,198 | 7/1999 | Fujioka | 327/262 |

OTHER PUBLICATIONS

Natsuki Kushiyama et al., *A 500–Megabyte/s Data–Rate 4.5M DRAM*, IEEE Journal of Solid State Circuits, Bol. 28, No. 4, Apr. 1993, pp. 490–498.

*Primary Examiner*—Dennis M. Butler
*Attorney, Agent, or Firm*—Kelly K. Kordzik; Winstead Sechrest & Minick P.C.; Anthony V. S. England

[57] ABSTRACT

In order to transmit several data words in succession over a bus between components in a data processing system, the skew between the various bus lines has to be compensated in order that each data word is accurately received. The skew compensation is implemented by setting predetermined delays on certain bus lines in response to the comparison of a test pattern with an ideal situation.

13 Claims, 8 Drawing Sheets

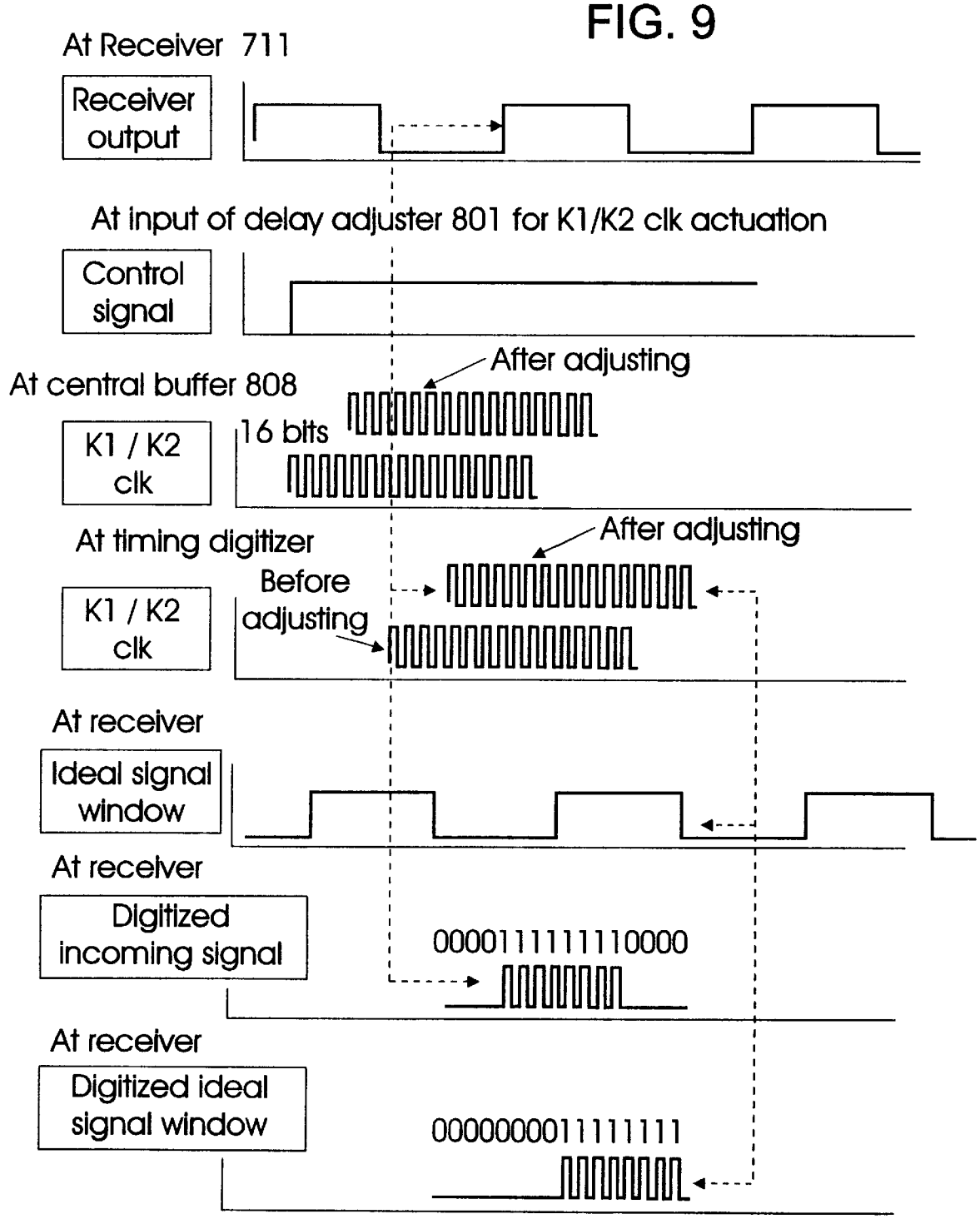

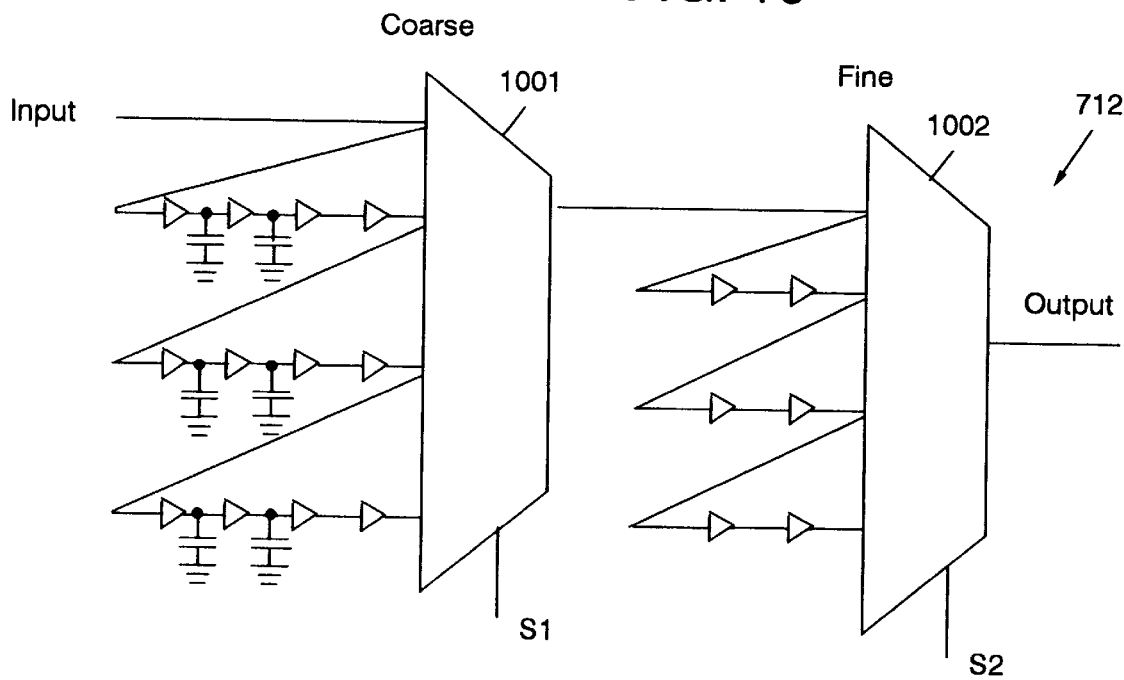
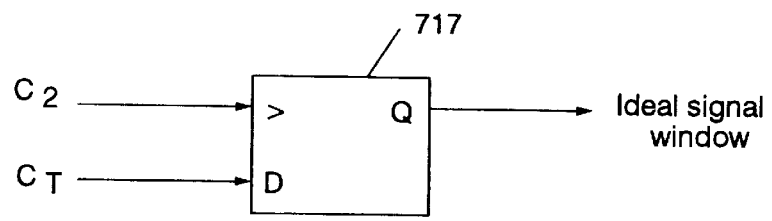
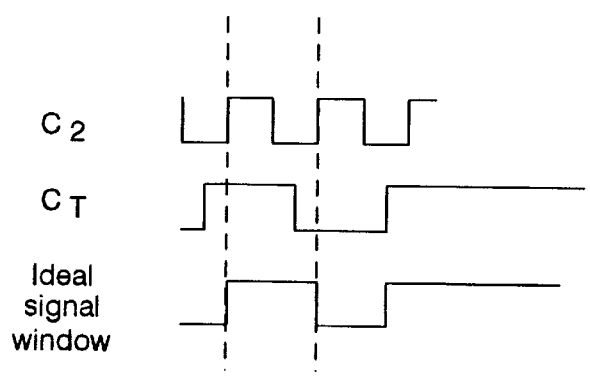

SYSTEM AND METHOD FOR ALLEVIATING SKEW IN A BUS

TECHNICAL FIELD

The present invention relates in general to data processing systems, and in particular, to compensating for skew in individual bus lines between components in a data processing system.

BACKGROUND INFORMATION

FIG. 1 illustrates a multiprocessing system 100 having a central processor ("CP") chips 101, which may also include secondary (L2) caches, coupled to memory controllers 102. Memory controllers 102 may be coupled to memory card controllers 105 directly or through a transceiver 103. Each of the memory card controllers 105 may be part of a memory card 104, including a plurality of DRAMs 106. A plurality of buses couple components 101–106 to each other in various configurations.

Efforts are continuously made to increase the speed by which these components 101–106 process data. However, one of the limiting factors regarding the maximum speed by which the entire system 100 can operate is the speed that data can be transferred over these buses between the components. A typical bus operation has been the transfer of a data bit on each bus line between two components one at a time. In other words, the next data bit is not transferred until the previous data bit has been successfully latched by the receiving component. In order to increase this transfer speed, multiple bits may be transferred in succession over each bus line without this requirement that a subsequent bit wait until a previous bit has been successfully received. In other words, a snapshot of a bus line would show that there are a plurality of bits presently traveling between the components on any one bus line.

To transfer multiple bits over each bus will increase data transfer frequency significantly or reduce the data transfer cycle time significantly. To properly capture the signal of a multiple lines data bus, the data arrival time at the receiver of all the lines has to fall into a timing window. The length of such a timing window is related to the length of data transfer cycle. As the cycle time is reduced, the capture timing window is also reduced.

Since a bus has a plurality of bus lines for sending a plurality of bits in parallel (which are often associated with a particular word), if certain factors operate to cause one or more of these bits to travel faster or slower than the other bits traveling in parallel, there is the possibility that the receiving component will only receive a portion of a data word before the next data word arrives. With the prior art method of data transfer, the cycle time is relatively high, and thus the miscapturing of data from different cycles will not occur.

Such delays may be caused by one or more of several reasons, including the non-uniform length of the various bus lines within a bus. Referring to FIG. 2, there is illustrated components 201 and 202 interconnected by a bus having bus lines 203–210. As can be seen, lengths of bus lines 203–210 vary depending upon their layout on the printed circuit board. It can be readily appreciated that at high speeds, the time it takes for a bit to travel over bus line 205 will be greater than the time for a parallel bit to travel over bus line 206. Another factor may be the different positioning of the various drivers within one of the components for driving the bits onto the bus lines. These driver circuits may be in different locations on the chip, and furthermore, the fabrication processes utilized to manufacture the chip may result in different operating speeds for these various drivers. Uneven processing may also account for variations in the quality of the individual bus lines. Further, the power supply noise will vary the delay of a driver. The power supply noise can also vary the timing of the launching clock which in turn can change the data bus signal timing.

As a result of such factors, skew may be introduced into one or more of the bus lines resulting in an unsatisfactory delay in the arrival of bits over these bus lines. Such unsatisfactory delays hamper the ability of the capture latch to capture the signal for multiple data words to be transferred at one time over the bus.

Some of these factors which affect the timing of the signal are invariant with respect to time such as the length difference between signal lines. Some of these factors are variant with time such as the driver delay variation due to power supply. A static compensation technique can be used to compensate the time invariant skews.

As a result, there is a need in the art for a technique for compensating for such skew.

SUMMARY OF THE INVENTION

The present invention provides a most signal skew tolerant timing window for signal transfer in relation to the capture clock timing. The teaching of this invention is to align the signal of each signal line, through delay insertion, to the most skew tolerant timing window basing upon repeatedly sampling of signal timing of each signal line. Such an alignment will significantly improve the signal bus data capture capability and consequently reduce the data transfer cycle time for multiple bits data transfer.

The present invention involves inserting a delay adjuster between the receiver and the latches associated with each bus line. The purpose of the delay adjuster is to insert delay to each path so that the signal arrives at the capture latch in the most favorable condition (skew tolerant wise). To calibrate the delay of each signal path, a timing digitizer is used. The timing digitizer may be an 8–6 bit shift register cell. The shift register cell is triggered by a clock with a frequency 4× that of the CPU frequency. The timing digitizer is placed subsequent to the timing adjuster. To determine the timing relationship between the clock and the incoming signal, an ideal signal window generated by the local clock is also fed into another timing digitizer. All shift register cells for the timing digitizers are tied together as a scan chain to be scanned out and passed on to a service processor which compares the delay of each signal path with an idea signal window and subsequently inserts delay using the timing adjusters to particular bus lines.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 9 illustrates a delay sampling timing diagram;

FIG. 10 illustrates further detail of a delay adjuster;

FIG. 11 illustrates further detail of an ideal signal window generator; and

DETAILED DESCRIPTION

Figure 1:
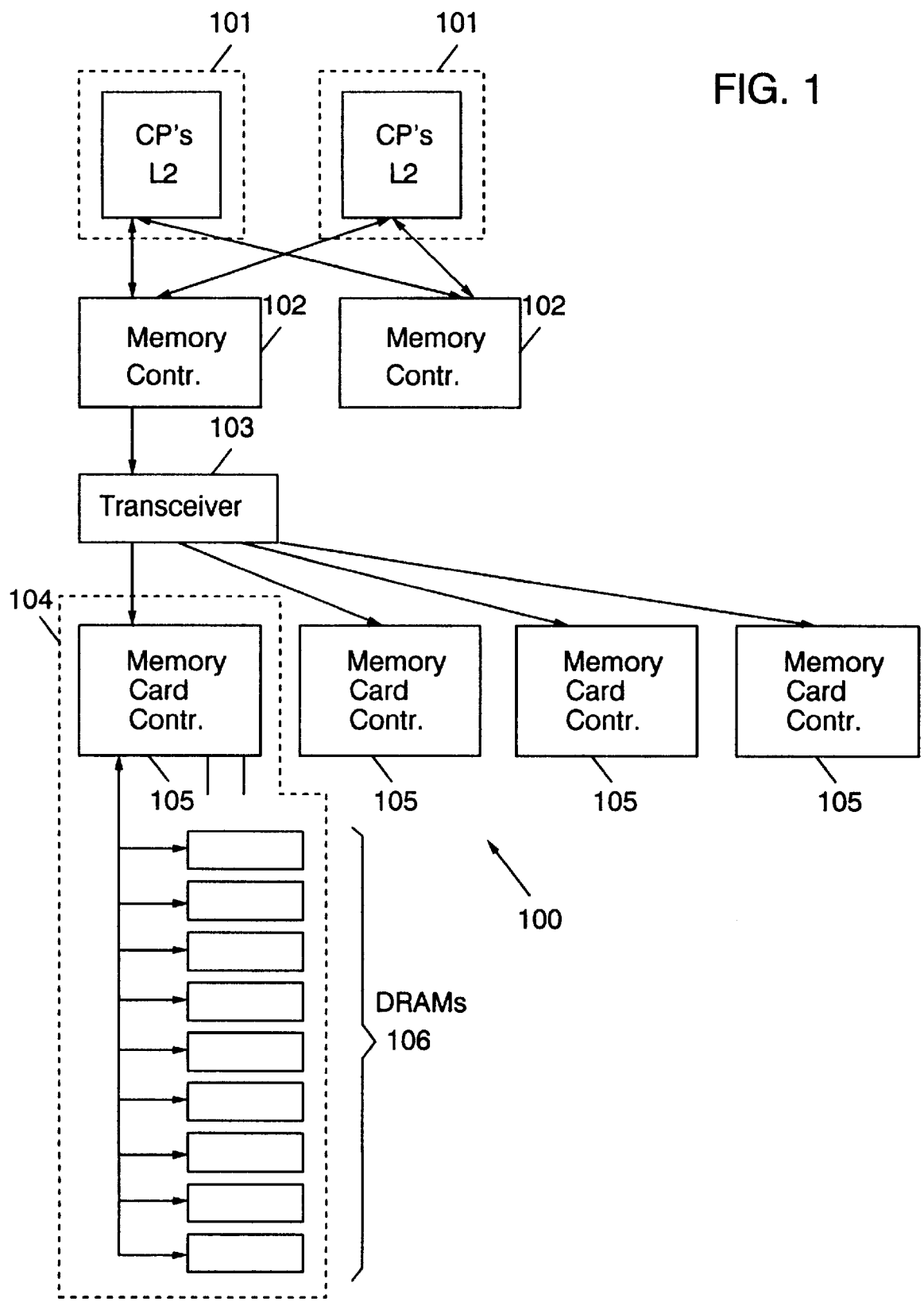
FIG. 1 illustrates a multiprocessing system configured in accordance with the present invention.
Figure 2:
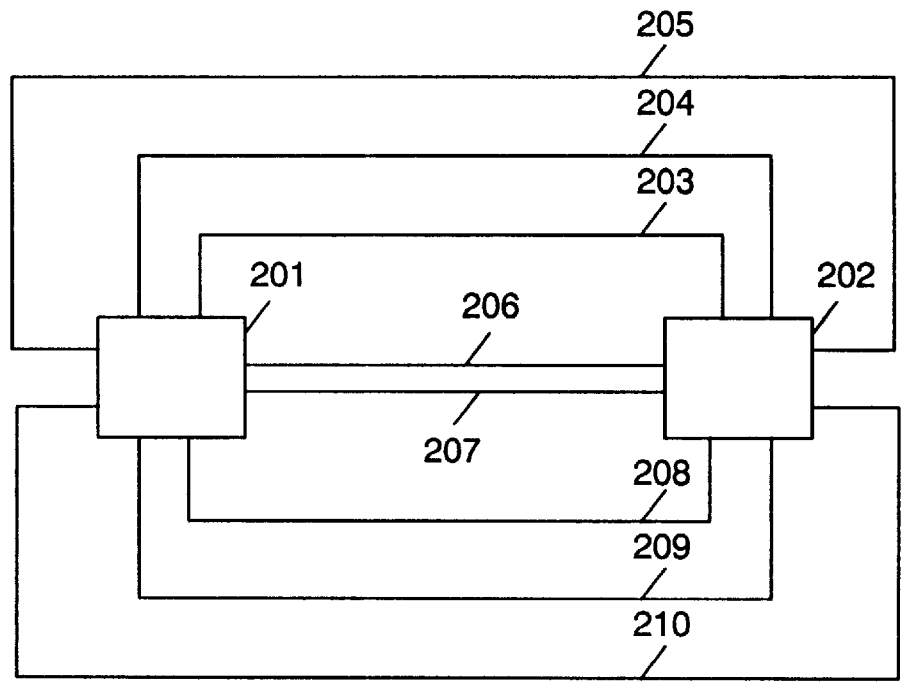
FIG. 2 illustrates non-uniform line lengths within a bus.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The present invention improves the capture latch to capture signals and alleviates skew associated with the individual bus lines within a bus, or net, coupling various components within a data processing system. Such a data processing system is illustrated in FIG. 1. The present invention may be utilized for any of the various busses connecting components 101–106, or even between a CP 101 and its L2 on the chip or off chip.

Figure 3:
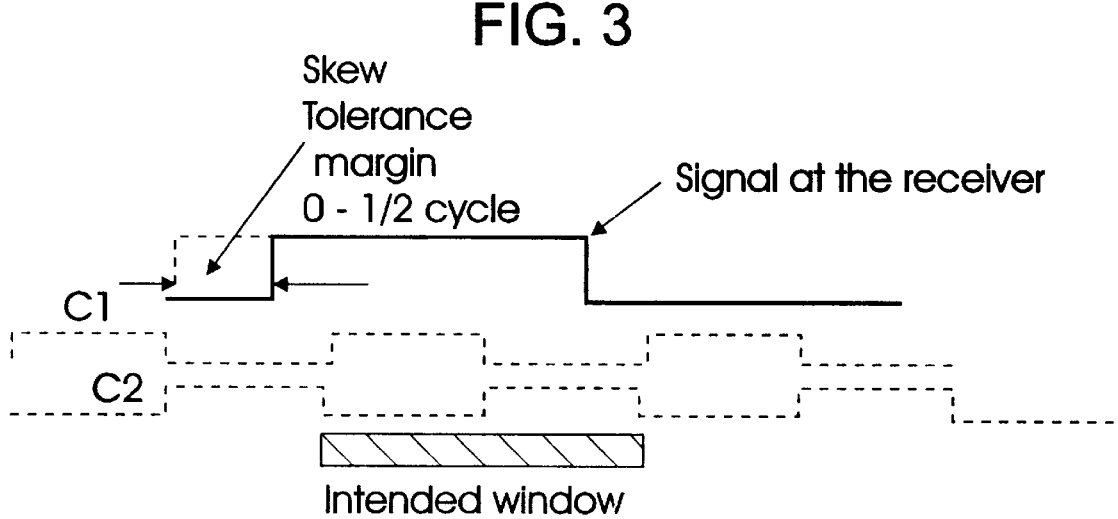
FIG. 3 illustrates the skew tolerance margin for a signal received at a receiver.

A bus comprises a plurality of bus lines enabling a plurality of bits to be transferred over the bus in a parallel configuration. Such a parallel grouping of bits may comprise a data word or some equivalent. To successfully transmit such a succession of bits onto the bus, little or no skew can be tolerated in each one of the bus lines, since it is important that a particular bit be received within a specified clock cycle. FIG. 3 illustrates a maximum amount of skew which can be tolerated without causing a signal to be captured within a wrong clock window. The intended window is the clock cycle over which the data signal must be received at the receiver. With the exemplary signal illustrated, the skew tolerance margin can be from anywhere between zero and one-half of a cycle. If the skew is greater than the margin, then the signal may be captured at the receiver during a cycle other than within the intended window.

Figure 4:
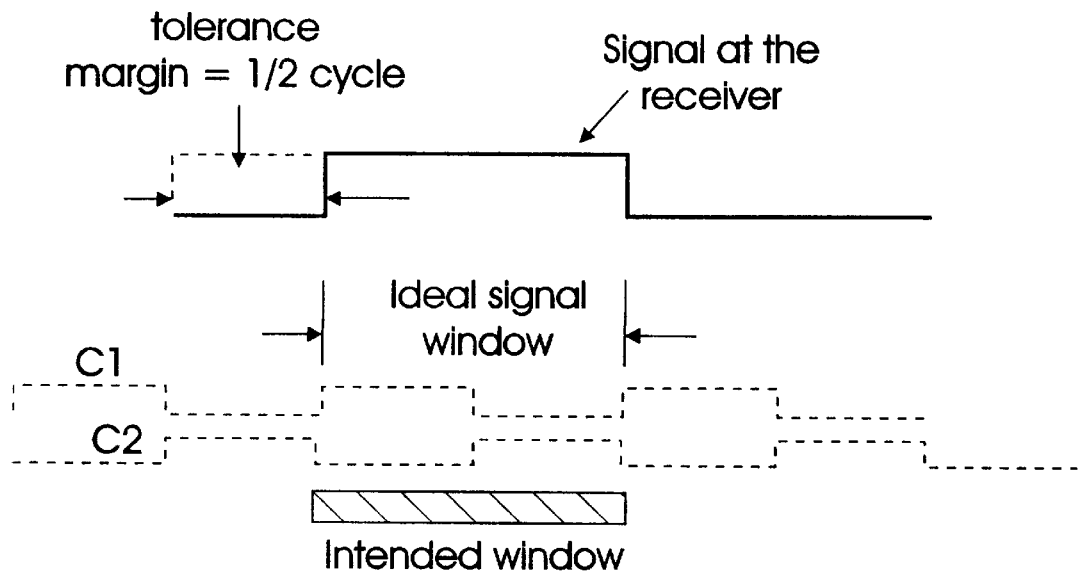
FIG. 4 illustrates an idea signal window.

The ideal signal is illustrated in FIG. 4 as being received at the receiver exactly coincident with the intended window, which is the ideal signal window. In such a case, the maximum skew tolerance is equal to one-half of a bus cycle.

Figure 5:
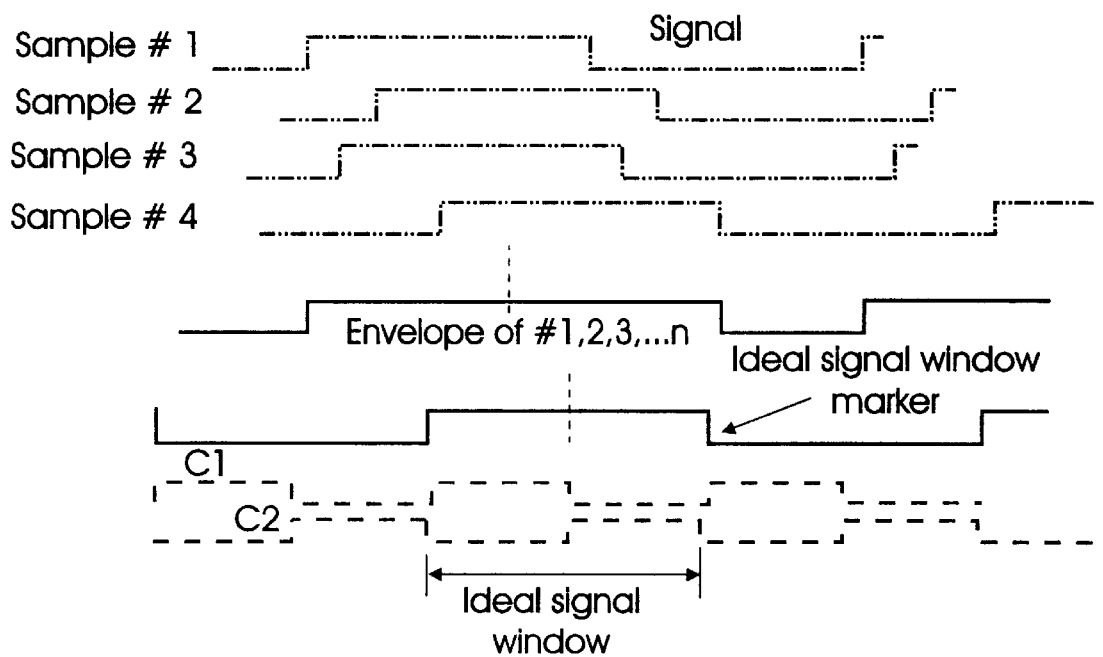
FIGS. 5 and 6 illustrate centering signal distribution of each bus net with respect to an idea signal window through adding extra delay.
Figure 6:
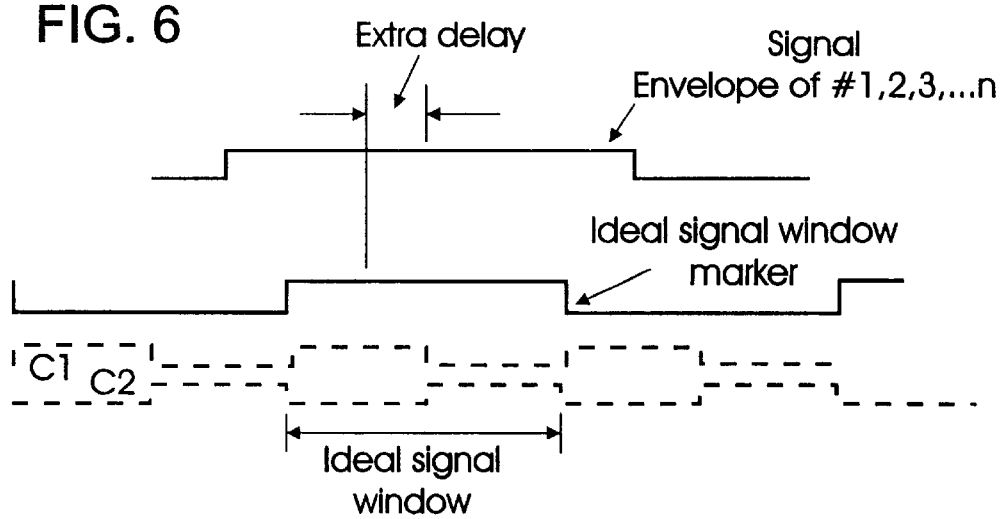

FIGS. 5 and 6 illustrate the concept of the present invention. In FIG. 5, over each bus line, a plurality, n, of samples are transmitted over the bus line and compared to a generated ideal signal, which represents an ideal signal window. The plurality of samples effective produce an envelope.

FIG. 6 illustrates how this signal envelope is shifted after undergoing compensation by the present invention, which in this example results in a portion of extra delay added to the bus line.

Figure 7:
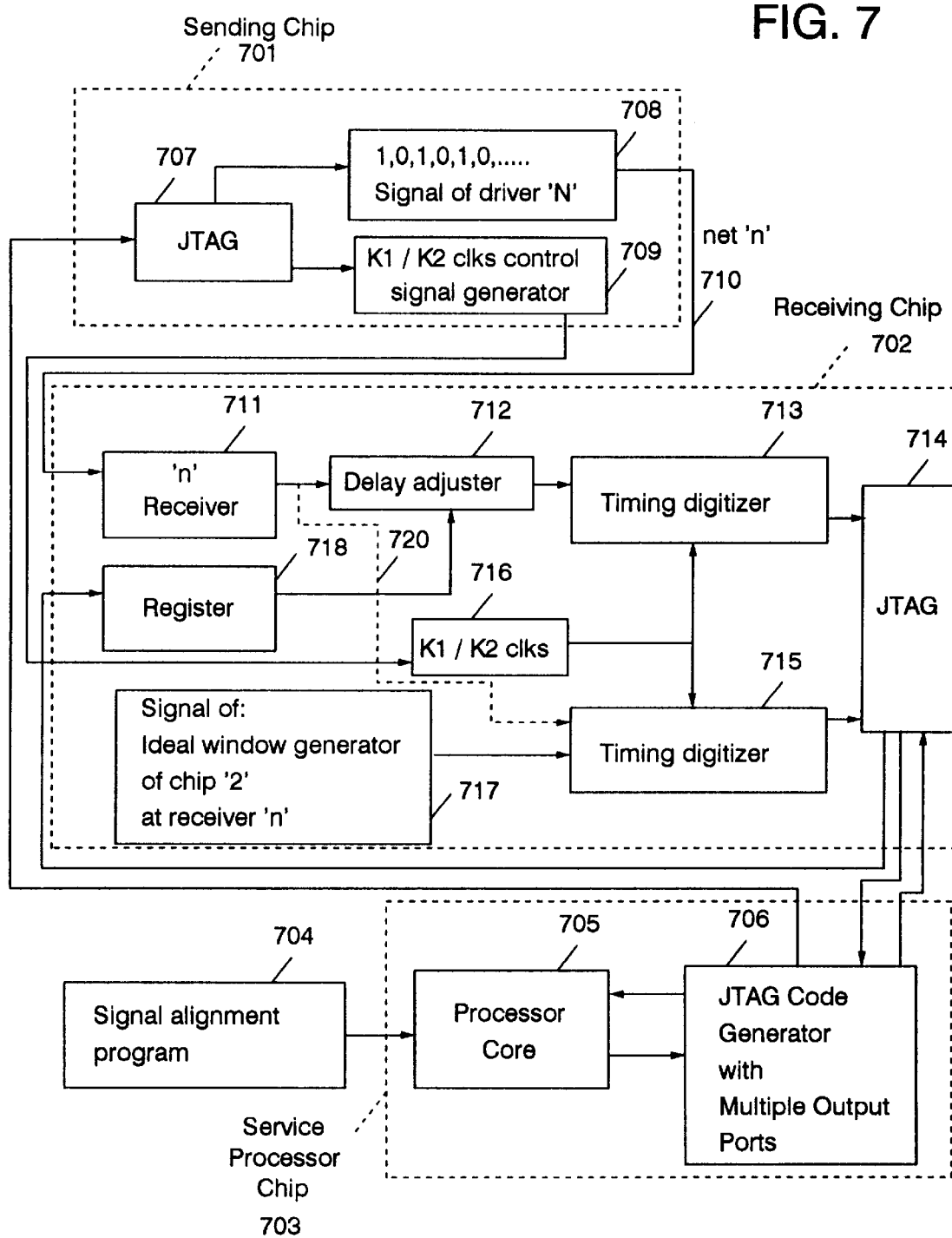
FIG. 7 illustrates a configuration of the present invention.

Referring next to FIG. 7, there is illustrated a block diagram of a configuration of the present invention whereby delay is added into various ones of the bus lines in bus 710 (net 'n'). Sending chip 701 and receiving chip 702 are coupled by bus 710 and may represent any two components within a data processing system connected by a bus, such as the data processing system illustrated in FIG. 1. Data words are transmitted over bus 710 by a plurality of drivers 708, and received by a plurality of receivers 711.

The present invention is implemented under the control of a service processor chip 703 employing a processor core 705, which receives the skew minimization program 704 of the present invention. The skew minimization process may be exercised after power on or on request. Chip 703 operates as a special processor to implement the skew minimization program 704. The processing capability is derived by processor core 705 through a JTAG protocol implemented within JTAG code generator 706 in chip 703 and JTAG circuitry 707 and 714 within chips 701 and 702, respectively.

JTAG is a standard protocol facility implemented within the industry for testing chips. Please refer to IEEE Std. 1149.1, IEEE Std. Test Access Port and Boundary-Scan Architecture, which is hereby incorporated by reference herein. An IEEE 1149.1 compliant chip has implemented therein control circuitry coupled to each of the I/O pins of the chip. This control circuitry is represented by blocks 707 and 714. Access to this JTAG control circuitry is provided by one or more I/O control pins whereby a test device, such as the circuitry within block 706 may be coupled for controlling and implementing various testing procedures on the chip.

Figure 8:
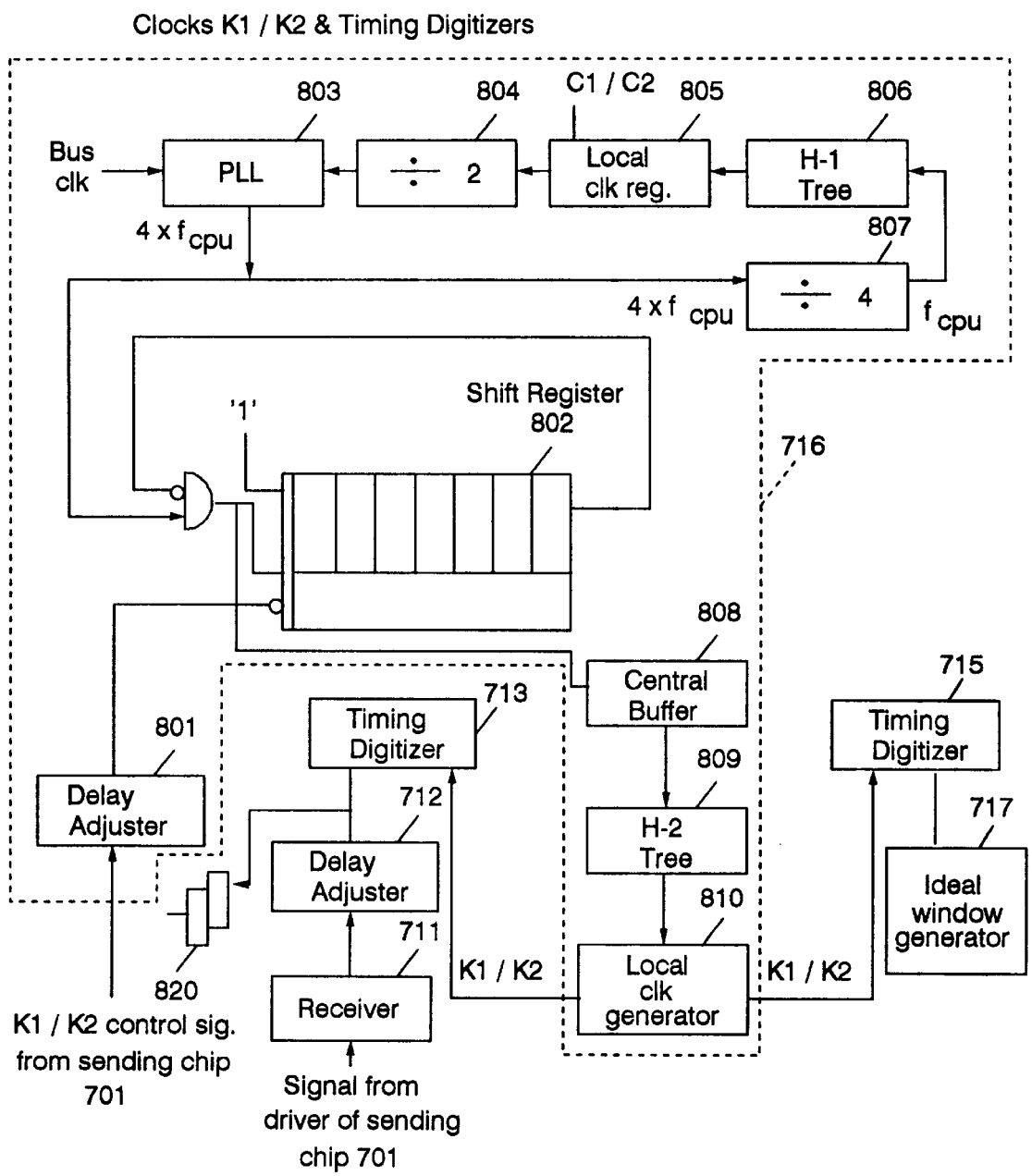
FIG. 8 illustrates further detail of the generation of the clock signal used by the timing digitizers.

In response to the signal alignment program 704, JTAG code generator 706 will cause JTAG control circuitry 707 to drive a predefined bit pattern from drivers 708 over bus 710. Blocks 707 and 714 contain the common JTAG circuits. Referring to FIG. 9, this signal is shown as being received at receiver 711. Additionally, a control signal is sent by K1/K2 clocks control signal generator 709 and received at delay adjuster 801 shown in FIG. 8. Delay adjuster 801 is used to adjust the timing of the K1/K2 clocks so that the digitized signal will be centered in the calibrated window (see FIG. 9). The K1/K2 clock signals may be an 8–16 multiple of clock signals, and are generated by the circuitry including phased lock loop 803, dividers 804 and 807, local clock generator 805, and H-1 tree 806, along with shift register 802. The signal from this circuitry is received by central buffer 808, which is then transferred to H-2 tree 809 and then to K1/K2 local clock generator 810.

The incoming signal is digitized by timing digitizer 713, while the ideal window generated by generator 717 is digitized by timing digitizer 715. These are then compared through the JTAG circuitry 714 and 706 and processor 705, and a delay signal is then sent through register 718 to delay adjuster 712 to add in any required delay for each particular bus line. This process is performed for each bus line.

Latch 820 represents the L1/L2 latch, which latches the incoming signal for use by receiving chip 702 for each bus line.

Dashed line 720 (see FIG. 7) represents a signal path from receiver 711 to timing digitizer 715 used for calibrating the delay adjuster 712. The output of the timing digitizer 713 corresponds to the delayed signal through delay adjuster 712. The output of the timing digitizer 715, when 720 is selected as input, corresponds to signal without delay insertion. Comparing these two output signals, the delay adjuster is calibrated.

Further detail of delay adjuster 712 is shown in FIG. 10 which can provide a coarse delay adjustment with multiplexer 1001 and a fine delay adjustment with multiplexer 1002, in response to selection signals S1 and S2 received from register 718.

FIG. 11 illustrates in further detail ideal window generator 717.

Figure 12:
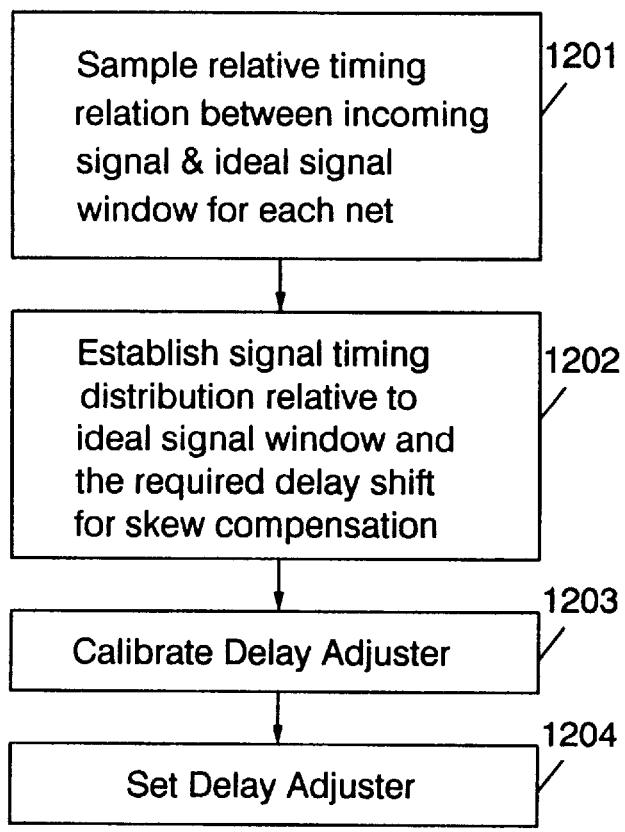
FIG. 12 illustrates a flow diagram configured in accordance with the present invention.

FIG. 12 illustrates the signal alignment program of the present invention. In step 1201, for each bus line, JTAG control circuitry 714 samples the relative timing relation between the incoming signal received by receiver 711 and the ideal signal window generated by window generator 717. In step 1202, the program compares the digitized versions of the incoming signal and the ideal signal window to compute how much delay to compensate for skew. This may merely be counting how many bits the signals are different and then using this number through register 718 to produce signal S1 to be received by delay adjuster 712 for incorporating required amounts of delay. In step 1203, the delay adjuster is calibrated, and in step 1204, the delay adjuster is set through the selection signals S1.

Although the present invention and its advantages have been described in detail, it should be understood that various changes, substitutions and alterations can be made herein without departing from the spirit and scope of the invention as defined by the appended claims.

What is claimed is:

1. A method for improving skew tolerance and compensating skew on a bus connecting first and second data processing components, the method comprising the steps of:

sending a signal over a bus line in the bus from the first component to the second component;

determining if the signal is received within a predetermined window; and delaying the signal if it is not received within the predetermined window, wherein the determining step further comprises the steps of:
digitizing the signal;
digitizing an ideal signal representing the predetermined window; and
comparing the digitized signal with the digitized ideal signal.

2. The method as recited in claim 1, wherein the delaying step further comprises the steps of:

in response to results of the comparing step, calculating an amount of delay to add to the signal; and adding the delay into a path carrying the signal to receive circuitry in the second component.

3. The method as recited in claim 2, wherein the sending, determining, and delaying steps are performed for each bus line within the bus.

4. The method as recited in claim 3, further comprising the step of transmitting a second word over the bus from the first component to the second component before a first and previous word transmitted by the first component has been received by the second component.

5. An apparatus comprising:

circuitry for driving a test signal from a first chip over each one of a plurality of bus lines to a second chip;

a receiver for receiving the test signal in the second chip;

a first timing digitizer for digitizing the test signal;

circuitry for generating an ideal signal window;

a second timing digitizer for digitizing the ideal signal window;

circuitry for comparing the digitized test signal with the digitized ideal signal window; and circuitry for inserting a delay into a path carrying the test signal in response to the comparison of the digitized test signal with the digitized ideal signal window.

6. The apparatus as recited in claim 5, further comprising circuitry for transmitting a second word over the bus lines from the first chip to the second chip before a first and previous word transmitted by the first chip has been received by the second chip.

7. The apparatus as recited in claim 5, wherein the driving circuitry, comparing circuitry and inserting circuitry is implemented with JTAG circuitry in the first and second chips and within a third chip, and a finite state machine controlling the process.

8. The apparatus as recited in claim 5, wherein the inserted delay ensures that the test signal is received within the ideal signal window with a maximum noise margin.

9. A data processing system comprising:

a first chip including a plurality of drivers and a first JTAG control circuit coupled to the plurality of drivers;

a second chip including a plurality of receivers, a plurality of delay adjusters coupled to the plurality of receivers, a plurality of first timing digitizers coupled to the plurality of delay adjusters, a plurality of ideal window generators, a plurality of second timing adjusters coupled to the plurality of ideal signal window generators, and a second JTAG control circuit coupled to the plurality of first and second timing adjusters;

a bus having a plurality of bus lines connecting the plurality of drivers to the plurality of receivers; and a third chip including a JTAG code generator coupled to a processor, wherein the JTAG code generator is coupled to the first and second JTAG control circuits.

10. The data processing system as recited in claim 9, wherein the processor is operable for running a skew compensation program that comprises the steps of:

driving a plurality of test signals from the plurality of drivers over each one of the plurality of bus lines to the plurality of receivers;

digitizing the plurality of test signals with the plurality of first timing digitizers;

generating a plurality of ideal signal windows with the plurality of ideal signal window generators;

digitizing the plurality of ideal signal windows with the plurality of second timing digitizers;

comparing the plurality of digitized test signals with the plurality of digitized ideal signal windows; and inserting a delay with one of the plurality of delay adjusters into a path carrying one of the plurality of test signals in response to the comparison of the plurality of digitized test signals with the plurality of digitized ideal signal windows.

11. The data processing system as recited in claim 9, wherein each of the timing digitizers converts a pulse signal into a plurality of shorter pulse signals wherein the plurality of shorter pulse signals has a time duration the same as the pulse signal.

12. The method as recited in claim 1, wherein the steps of digitizing the signal and digitizing the ideal signal each convert a pulse signal into a plurality of shorter pulse signals wherein the plurality of shorter pulse signals has a time duration the same as the pulse signal.

13. The apparatus as recited in claim 5, wherein each of the timing digitizers converts a pulse signal into a plurality of shorter pulse signals wherein the plurality of shorter pulse signals has a time duration the same as the pulse signal.

* * * * *